United States Patent
Pang et al.

(10) Patent No.: US 6,597,528 B1
(45) Date of Patent: Jul. 22, 2003

(54) SELF-ADAPTIVE SEEKING PROFILE FOR RESONANCE ACTUATOR

(75) Inventors: Louis Seng Hong Pang, Singapore (SG); Kian Keong Ooi, Singapore (SG); Jack Ming Teng, Singapore (SG); Ming Zhong Ding, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/558,265

(22) Filed: Apr. 25, 2000

Related U.S. Application Data

(60) Provisional application No. 60/141,619, filed on Jun. 30, 1999.

(51) Int. Cl.[7] .............................................. G11B 5/596
(52) U.S. Cl. .................................................. 360/78.04
(58) Field of Search .......................... 360/78.01, 78.04, 360/78.07, 78.09

(56) References Cited

U.S. PATENT DOCUMENTS

| | | | | |
|---|---|---|---|---|
| 5,132,285 A | | 7/1992 | Tsai .......................... 507/121 |
| 5,189,571 A | | 2/1993 | Murphy et al. .............. 360/75 |
| 5,305,158 A | | 4/1994 | Ueda et al. .................. 360/75 |
| 5,859,742 A | | 1/1999 | Takaishi ................... 360/78.01 |
| 5,886,489 A | | 3/1999 | Rowan et al. .............. 318/439 |
| 5,917,672 A | * | 6/1999 | Pham et al. ............. 360/78.09 |
| 6,031,683 A | * | 2/2000 | Iverson et al. ........... 360/78.04 |
| 6,101,065 A | * | 8/2000 | Alfred et al. ............ 360/78.04 |
| 6,166,876 A | * | 12/2000 | Liu ......................... 360/78.04 |
| 6,178,060 B1 | * | 1/2001 | Liu ......................... 360/78.07 |
| 6,195,222 B1 | * | 2/2001 | Heminger et al. ....... 360/78.07 |
| 6,429,996 B1 | * | 8/2002 | Iwashiro .................. 360/78.07 |
| 6,456,451 B1 | * | 9/2002 | Asano et al. ............. 360/77.04 |

* cited by examiner

*Primary Examiner*—David Hudspeth
*Assistant Examiner*—Fred F. Tzeng
(74) *Attorney, Agent, or Firm*—Derek J. Berger

(57) ABSTRACT

A disc drive includes a base and a disc rotatably attached to the base. The disc drive also includes an actuator assembly rotatably attached to said base and a device for moving the actuator assembly. The actuator assembly includes a transducer head in a transducing relationship with respect to the disc. The disc drive includes a disc drive controller for controlling movement of the actuator during track follow and track seek operations. The disc drive controller monitors the actuator during seek operations. The disc drive controller further computes a maximum average settle time from the monitored settle times. The dis drive controller further compares the maximum average settle time to a predetermined threshold value, and issues a command signal to adjust seek profile parameters of the disc drive to eliminate resonance in the actuator arm during a seek operation.

20 Claims, 6 Drawing Sheets

SELF-ADAPTIVE SEEKING PROFILE FOR RESONANCE ACTUATOR

RELATED APPLICATION

This application claims the benefit of U.S. Provisional Application Serial No. 60/141,619, filed Jun. 30, 1999 under 35 U.S.C. 119(e).

FIELD OF THE INVENTION

The present invention relates to the field of mass storage devices. More particularly, this invention relates to a method of eliminating resonance in an actuator arm of a disc drive.

BACKGROUND OF THE INVENTION

One key component of any computer system is a device to store data. Computer systems have many different places where data can be stored. One common place for storing massive amounts of data in a computer system is on a disc drive. The most basic parts of a disc drive are an information storage disc that is rotated, an actuator that moves a transducer head to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

The transducer head is typically placed on a small ceramic block, also referred to as a slider, that is aerodynamically designed so that it flies over the disc. The slider is passed over the disc in a transducing relationship with the disc. Most sliders have an air-bearing surface ("ABS") which includes rails and a cavity between the rails. When the disc rotates, air is dragged between the rails and the disc surface causing pressure, which forces the head away from the disc. At the same time, the air rushing past the cavity or depression in the air bearing surface produces a negative pressure area. The negative pressure or suction counteracts the pressure produced at the rails. The slider is also attached to a load spring which produces a force on the slider directed toward the disc surface. The various forces equilibrate so the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the storage disc. Disc drive systems read and write information stored on tracks on storage discs. Transducers, in the form of read/write heads attached to the sliders, located on both sides of the storage disc, read and write information on the storage discs when the transducers are accurately positioned over one of the designated tracks on the surface of the storage disc. The transducer is also said to be moved to a target track. As the storage disc spins and the read/write head is accurately positioned above a target track, the read/write head can store data onto a track by writing information representative of data onto the storage disc. Similarly, reading data on a storage disc is accomplished by positioning the read/write head above a target track and reading the stored material on the storage disc. To write on or read from different tracks, the read/write head is moved radially across the tracks to a selected target track. The data is divided or grouped together on the tracks. In some disc drives, the tracks are a multiplicity of concentric circular tracks. In other disc drives, a continuous spiral is one track on one side of disc drive. Servo feedback information is used to accurately locate the transducer head. The actuator assembly is moved to the required position and held very accurately during a read or write operation using the servo information.

The actuator is rotatably attached to a shaft via a bearing cartridge which generally includes one or more sets of ball bearings. The shaft is attached to the base and may be attached to the top cover of the disc drive. A yoke is attached to the actuator. The voice coil is attached to the yoke at one end of the rotary actuator. The voice coil is part of a voice coil motor which is used to rotate the actuator and the attached transducer or transducers. A permanent magnet is attached to the base and cover of the disc drive. The voice coil motor which drives the rotary actuator comprises the voice coil and the permanent magnet. The voice coil is attached to the rotary actuator and the permanent magnet is fixed on the base. A yoke is generally used to attach the permanent magnet to the base and to direct the flux of the permanent magnet. Since the voice coil sandwiched between the magnet and yoke assembly is subjected to magnetic fields, electricity can be applied to the voice coil to drive it so as to position the transducers at a target track.

Quick and precise positioning requires the reduction of the vibration of the magnetic disc apparatus caused by the driving reaction force to the voice coil motor. What is needed is a disc drive which has is less susceptible to the reaction forces. This will improve settling characteristics after a seek from a first track on the disc to a target track on the disc and will improve track following operations of the disc drive. In other words, there is a need for a disc drive that has less relative motion between the actuator assembly and the base while under any type of servo control that requires corrections to be implemented with the voice coil motor. There is also a need for a static solution so that the resulting disc drive is more reliable over the life of the drive. Also needed is a device that can be assembled using current assembly techniques.

One constant goal associated with disc drives is to decrease or lessen the access time to data. Increasing the speed at which data can be retrieved is very desirable in a disc drive. The decrease in access time increases the speed at which a computer system can perform operations on data. When a computer is commanded to perform an operation on data or information that needs to be retrieved, the time necessary to retrieve the data from the disc is generally the bottleneck in the operation. When data is accessed more quickly, more transactions can generally be handled by a computer in a particular unit of time.

Most of the methods for controlling access time include referring to a seek profile. A seek profile is a pre-programmed equation or table which lists a desired velocity verses the stopping distance remaining until reaching the target track. In other words, a seek profile provides the velocity the transducer head should have at varying distances from the destination or target track and, at each of a succession of tracks terminating with the destination or target track. Generally, the seek profile (velocity) value is the highest possible value of velocity the actuator can have at a particular remaining distance to allow the actuator to be decelerated to a stop upon reaching the destination or target track. Of course, there may be factors, such as power savings, that may steer designers away from following the highest possible velocity.

The seek profile is shaped with respect to the number of tracks remaining in a seek to cause the transducer head to initially accelerate toward the destination or target track and subsequently decelerate to the destination or target track. In long seeks, these stages of the seek may be separated by a stage in which the transducer head traverses a series of tracks at a maximum speed that is selected on the basis of any of a number of criteria used by the manufacturer of the disc drive. For example, the maximum speed may be chosen to be the maximum speed the transducer head can attain with the power supply that is used to operate the servo system. A control signal is provided to the power amplifier that is directly proportional to the difference between the profile velocity and the actual velocity of the transducer head.

A typical seek is accomplished using closed loop control. The distance left to go to the destination or target track is determined and then the corresponding velocity from the velocity profile is selected. The difference between the actual actuator velocity and profile actuator velocity is provided to the servo controller. This value is then multiplied by a gain to give a control current output to the voice coil.

It is very crucial for the disc drives to have a smooth and clean seek settling, that is free from any resonance. This will generally help minimize missed revolutions and decrease access times and will also help in improving disc drive's through-put performance. During manufacturing, disc drives found to have resonance in the actuator arms are rejected as disc drives having resonance are considered fatal error and therefore they are scrapped. This increases the production costs, and inconsistent throughput performance from disc drive to disc drive. Also the current compensation methods to overcome resonance in the disc drive actuator arms are not very effective, because the current methods require reducing the overall servo loop gain once the seek profile has been executed by the servo controller. It has been found that for disc drives having resonance problem, once an actuator arm is excited with the seek profile, it was difficult to eliminate the resonance by reducing the overall servo loop gain.

What is needed is a method to salvage disc drives having resonance, that reduces production costs, and improves throughput performance in the disc drives. What is also needed is a method to reduce resonance related noise in the disc drives having resonance problems, without having to reduce the overall servo loop gain after the seek profile has been executed by the servo controller.

SUMMARY OF THE INVENTION

A disc drive includes a base and a disc rotatably attached to the base. The disc drive also includes an actuator assembly rotatably attached to said base and a device for moving the actuator assembly. The actuator assembly includes a transducer head in a transducing relationship with respect to the disc. The disc drive includes a disc drive controller for controlling the movement of the actuator during track follow and track seek operations. The disc drive further includes a servo controller coupled to the actuator assembly for monitoring the actuator during seek operations. The disc drive controller further includes an analyzer, coupled to the servo controller for obtaining a maximum average settle time from the monitored settle times for each zone. Also included is a comparator, coupled to the analyzer and the servo controller to compare the maximum average settle time to a predetermined threshold value, and to issue a first command signal (indicating that the actuator arm will resonate during a seek operation), when the maximum average settle time exceeds the predetermined threshold value. The disc drive controller further includes a counter coupled to the comparator. The counter monitors and increments a compensation count number by a predetermined compensation count number upon receiving the first command signal from the comparator, and further generates a second command signal to adjust seek profile parameters of the disc drive. Upon receiving the second command signal from the counter, the servo controller adjusts the seek profile parameters based on the compensation count number to eliminate the resonance in the actuator arm of the disc drive. The above steps are again repeated until the compensation count number exceeds a predetermined maximum number. When the compensation count number exceeds the predetermined maximum number, the disc drive is rejected for not being feasible to make anymore adjustments to the seek profile parameters, to eliminate the resonance in the actuator arm. Also included in the disc drive controller is a memory to store the compensation count number, and the threshold value.

Also discussed is a method of adjusting seek profile parameters of the disc drive during a seek operation to eliminate resonance in an actuator arm of the disc drive. Upon receiving a command to seek data from a zone on the disc drive, the disc drive controller checks for a value of a stored compensation count number for the zone in a memory, and at the same time generates a seek profile for the disc drive. Based on the value of the stored compensation count number for the zone, the disc drive controller adjusts the seek profile parameters of the zone in and issues a command to seek data on the disc drive.

Advantageously, the procedure set forth above and the apparatus for implementing the adjustment of the seek profile parameters to eliminate resonance of an actuator arm, allow for more consistent throughput performance from disc drive to disc drive and to reduce production costs by being able to salvage disc drive that would otherwise have been scrapped for having resonance in the actuator arm. Also the above procedure can improve the disc drive acoustic performance by eliminating the resonance in the actuator arm. The above procedure can be incorporated in microcode and used to control the servo circuitry to implement the invention.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
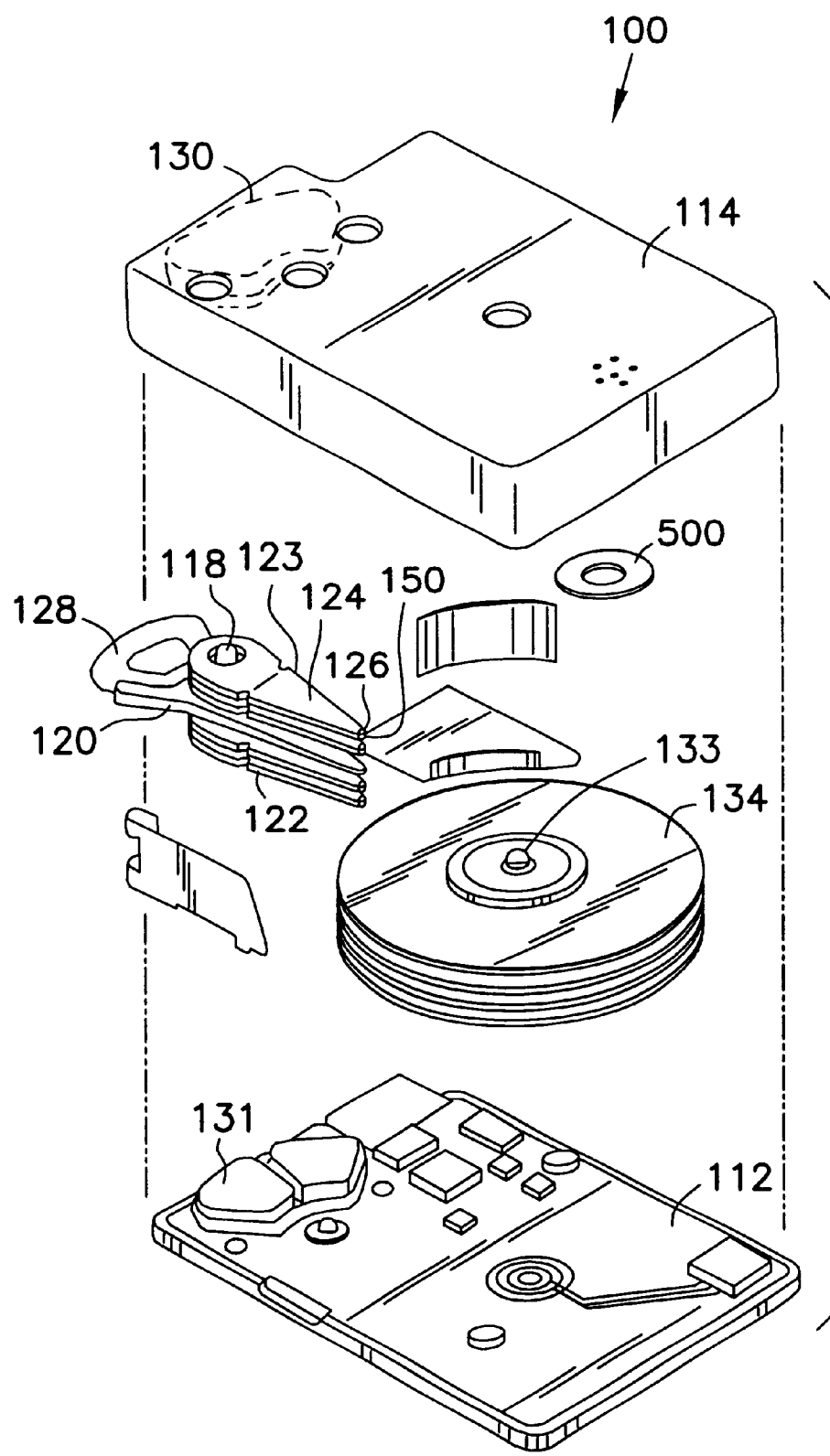
FIG. 1 is an exploded view of a disc drive with a multiple disc stack.

The invention described in this application is useful with all mechanical configurations of disc drives having either rotary or linear actuation. In addition, the invention is also useful in all types of disc drives including hard disc drives, zip drives, floppy disc drives and any other type of drives where unloading the transducer from a surface and parking the transducer may be desirable. FIG. 1 is an exploded view of one type of a disc drive 100 having a rotary actuator. The disc drive 100 includes a housing or base 112, and a cover 114. The base 112 and cover 114 form a disc enclosure. An inertia ring 500 is attached to the cover 114. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. On the end of the actuator arm assembly 120 opposite the load springs 124 and the sliders 126 is a voice coil 128.

Attached within the base 112 is a first magnet 131 and a second magnet 130. As shown in FIG. 1, the second magnet 130 is associated with the cover 114. The first and second magnets 130, 131, and the voice coil 128 are the key components of a voice coil motor which applies a force to the actuator assembly 120 to rotate it about the actuator shaft 118. Also mounted to the base 112 is a spindle motor. The spindle motor includes a rotating portion called the spindle hub 133. In this particular disc drive, the spindle motor is within the hub. In FIG. 1, a number of discs 134 are attached to the spindle hub 133. In other disc drives a single disc or a different number of discs may be attached to the hub. The invention described herein is equally applicable to disc drives which have a plurality of discs as well as disc drives that have a single disc. The invention described herein is also equally applicable to disc drives with spindle motors which are within the hub 133 or under the hub.

Figure 2:
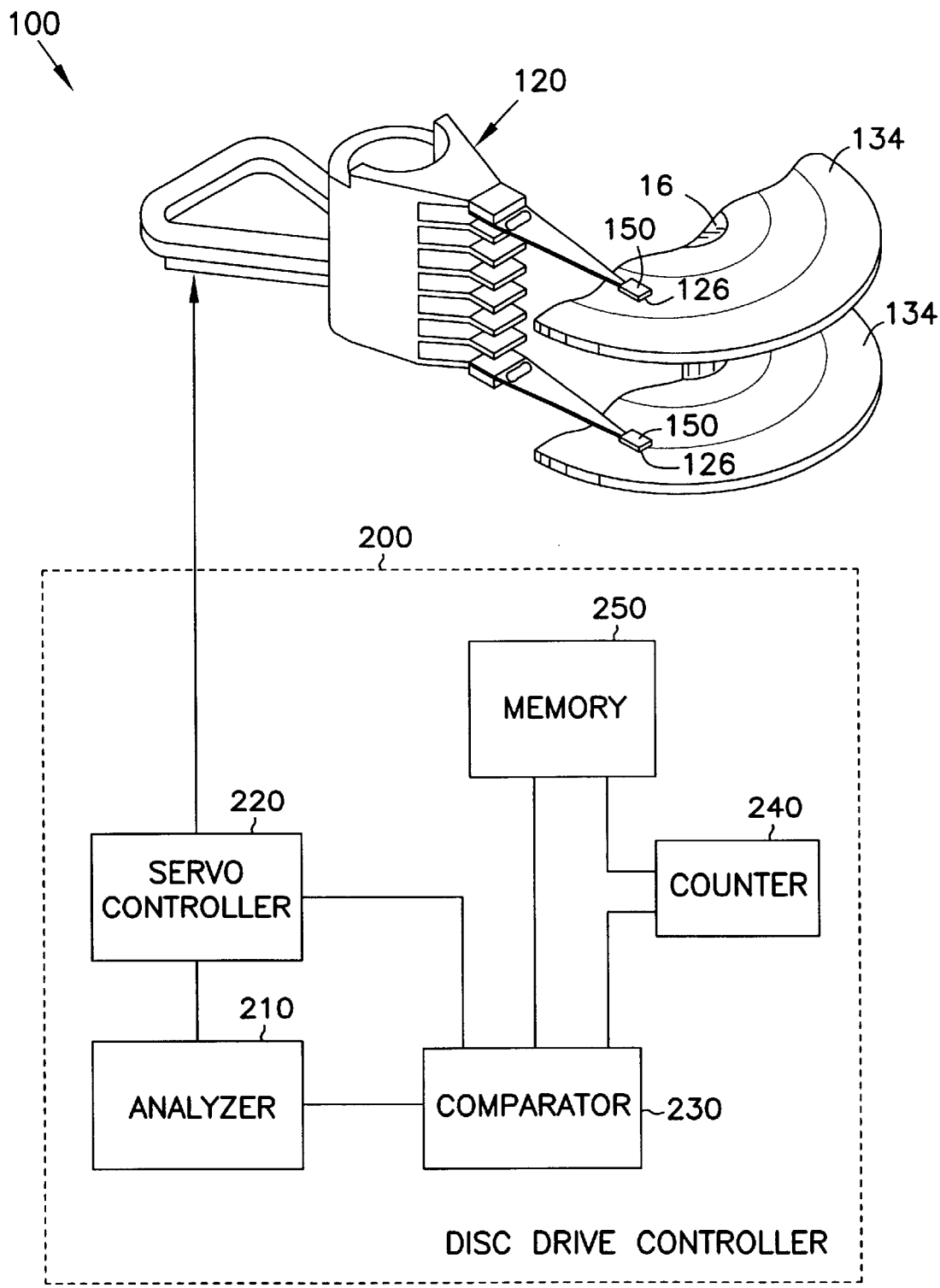
FIG. 2 is a schematic representation of a disc drive including portions of the disc drive controller used in adjusting seek profile parameters of the disc drive to eliminate resonance in an actuator arm of the disc drive.

FIG. 2 is a schematic representation of a disc drive 100 and further includes selected portions of a disc drive controller 200 used in adjusting the seek profile parameters of the disc drive 100. As shown in FIG. 2, the disc drive 100 includes at least one disc 134 rotatably attached to the base through a shaft 16. The disc drive 100 also includes an actuator 120 having a transducer head 126 and a transducer 150 for reading and writing to the disc 134. The actuator 120 carrying the transducer 126 in a transducing relation with respect to the disc 134. A disc drive controller 200 is coupled to the actuator 120, includes a servo controller 220 to monitor settle times during a resonance screen test of the disc drive. The disc drive controller 200 further includes an analyzer 210 coupled to the servo controller 220, to obtain a maximum average settle time for a zone from the monitored settle times during the resonance screen test of the disc drive. The disc drive controller also includes a comparator 230, coupled to the analyzer 210 and the servo controller 220. The comparator 230 compares the maximum average settle time for a zone to a predetermined threshold value, and generates a first command signal, when the maximum average settle time for the zone exceeds the predetermined threshold value. Also included in the disc drive controller 200 is a counter 240 coupled to the comparator, to monitor a compensation count number (N), and to further increment the compensation count number by a predetermined compensation count number (N=N+predetermined compensation count number) upon receiving the first command signal from the comparator, and to further generate a second command signal to indicate adjusting the seek profile parameters for the zone of the disc drive 100. In one embodiment the disc drive controller 200 further includes a memory 250 coupled to the counter 240 and the comparator 230 to store the compensation count number and the threshold value. In another embodiment the servo controller 220 monitors the settle times for a predetermined number of zones on the disc drive 100, during the resonance screen test. In this embodiment the analyzer 210 computes a predetermined number of average settle times for a zone from the monitored settle times during the resonance screen test. Then the analyzer 210 computes a maximum average settle time for the zone from the predetermined number of average settle times for the zone. In one embodiment the adjustment to the seek profile parameters includes reducing a originally maximum allowed digital-to-analog conversion output value by a first predetermined value, changing a seek feed forward value to a second predetermined value, and reducing a originally set seek profile gain of the actuator arm 120 by a third predetermined value. In another embodiment the first predetermined value is ($\frac{1}{2}^N$), the second predetermined value is one (0), and the third predetermined value is about 65%.

Figure 3:
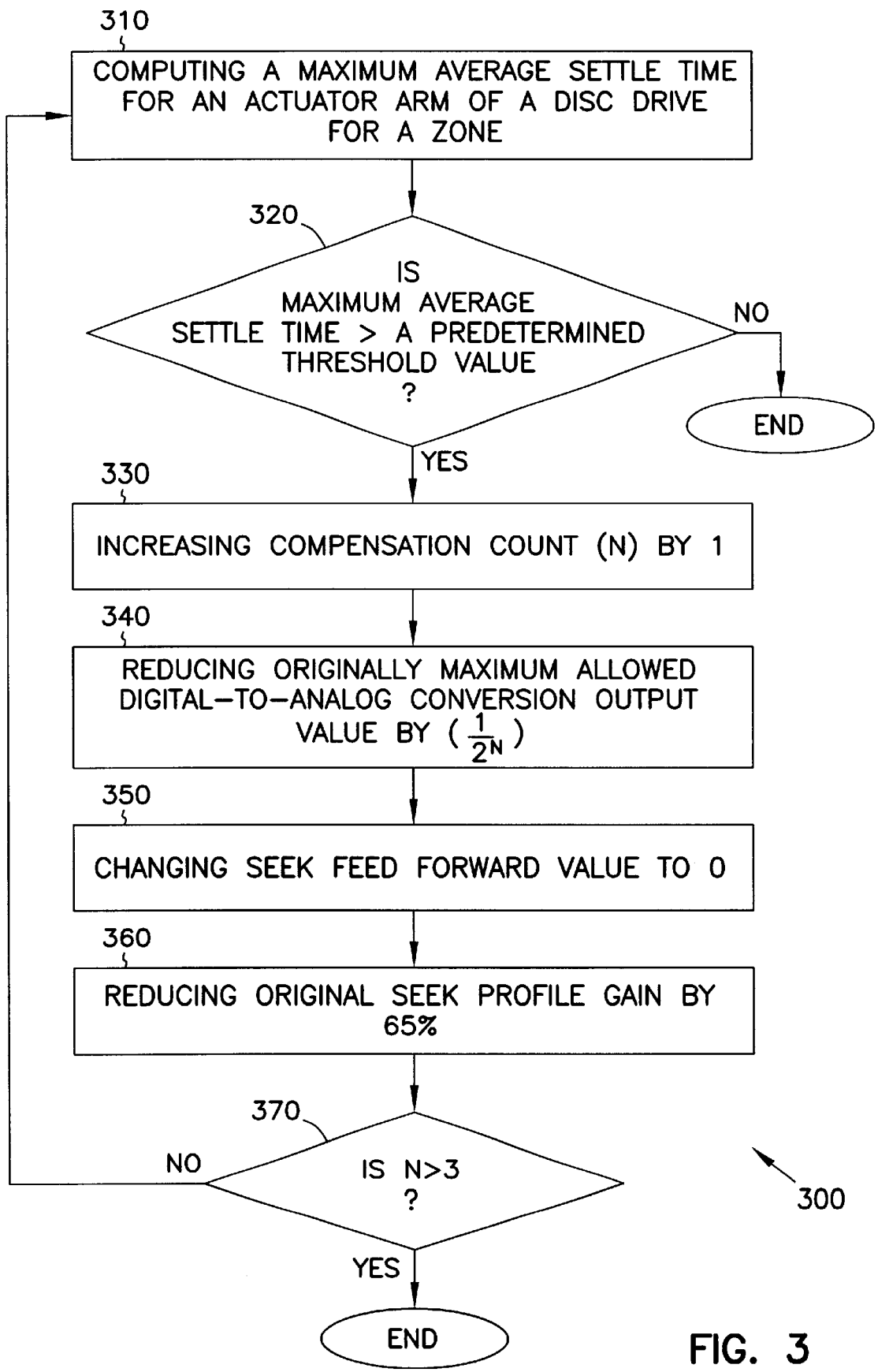
FIG. 3 is a flow diagram of the procedure of the instant invention.

FIG. 3 is a flow diagram of the method of adjusting seek profile parameters to eliminate resonance in an actuator arm of a disc drive 100 of the present invention. The first step in the method of adjusting seek profile parameters in a disc drive 300 is to compute a maximum average settle time for a zone of an actuator arm 120 of the disc drive 100 based on a resonance screen test 310, then to compare the maximum average settle time for the zone to a predetermined threshold value 320. If the maximum average settle time for the zone is less than or equal to the predetermined threshold value, then accepting the disc drive without making anymore adjustments to the seek profile parameters. If the maximum average settle time for the zone is greater than the predetermined threshold value, then increasing a compensation count number (N) by a predetermined compensation count number (N=N+predetermined compensation count number) 330, and adjusting the seek profile parameters to eliminate resonance in the actuator arm 120 based on the value of N (340, 350, and 360). Then the comparator compares N to a predetermined maximum number 370. If N is greater than the predetermined maximum number, then rejecting the disc drive as unable to compensate for resonance of the actuator arm. If N is less than the predetermined maximum number, the above outlined steps are repeated. The various parameters used in computing the average and maximum settle times can change in various embodiments. The predetermined maximum number is in the range of about 2 to 6. The computing of the maximum average settle time for the zone is based on computed predetermined number of average settle times for a zone on a disc of the disc drive. The computing of the average settle time for the zone is based on monitoring settle times for a predetermined number of seeks for the zone on the disc drive and then computing the average from the monitored settle times for the zone on the disc. The predetermined number of average settle times is approximately in the range of about 3 to 6. The predetermined number of zones is approximately in the range of about 10 to 40. The predetermined number of seeks is approximately in the range of about 32 to 128. The predetermined threshold value is approximately in the range of about 1 to 10 microseconds. In one embodiment, resonance screen test is performed at 3 different regions of the disc 134 (at outside, mid, and inner areas of the disc 134). In one embodiment the outside and inside areas are sub-divided into 8 zones and the mid area has only one zone (zones to test settle times is generally based on historical knowledge of resonance in the disc drives). This results in a total of 17 zones to be tested for settle times for a single transducer head. In one embodiment the transducer head is excited by performing a short seek and the settle times are monitored during the short seek operation. Seek operation during the resonance screen test is carried out to and from a zone for a predetermined number of seeks to derive at an average settle time for the zone. In one embodiment, the compensation count number for the zone is stored in a memory. In another embodiment the threshold value is stored in the memory. In one embodiment, the adjusting of the seek profile parameters for the zone further includes reducing a originally maximum allowed digital-to-analog conversion output value by a first pre-determined value 340, changing a seek feed forward value to a second predetermined value 350, and reducing a originally set seek profile gain by a third predetermined value 360. In one embodiment the first predetermined value is ($½^N$), the second predetermined value is zero, and the third pre-determined value is 65%. The first, second, and third predetermined values are generally stored in the memory. In one embodiment, the adjusting of the seek forward value is based on the value of N. If N is equal to zero, then the seek feed forward value is set to one (1), and if N is greater than zero, then the seek feed forward is set to zero (0). If N is greater than zero (0), then the values of N can be 1,2 or 3.

Figure 4:
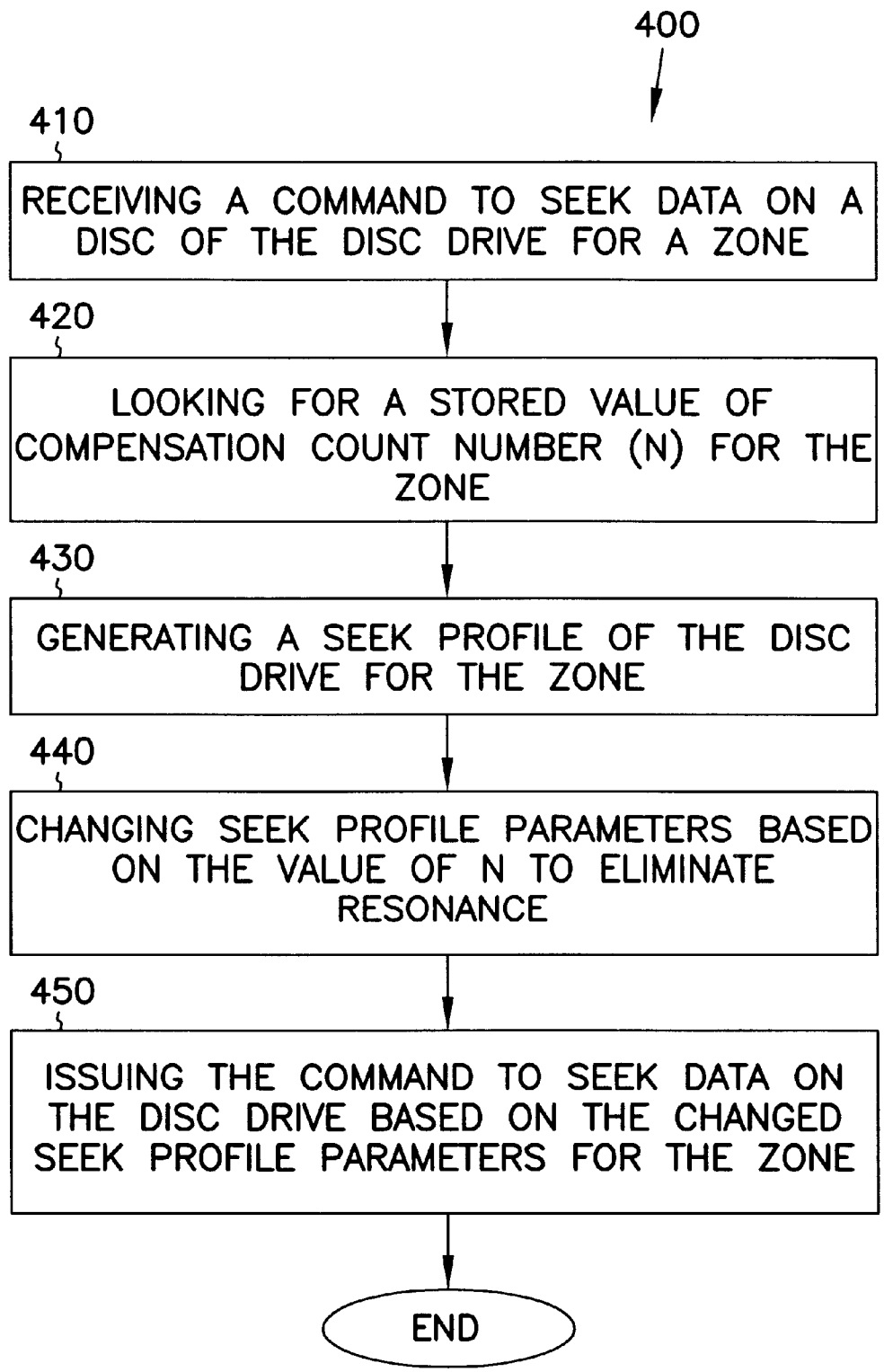
FIG. 4 is a flow diagram of the process of using the instant invention in a disc drive.

FIG. 4 is flow diagram of the process of using the present invention in a disc drive 100. The first step in the process is that the disc drive 100 receives a command to seek data on a disc 134 of the disc drive 410. Then the disc drive controller 200 obtains a stored value of compensation count number (N) 420. Then the disc drive controller 200 generates a seek profile for the disc drive. Then the disc drive controller changes seek profile parameters based on the value of N 430, to eliminate resonance in the actuator of the disc drive 100. Lastly, the disc drive controller 200 issues the command to seek data on the disc 134 based on the changed seek profile parameters 440.

Figure 5:
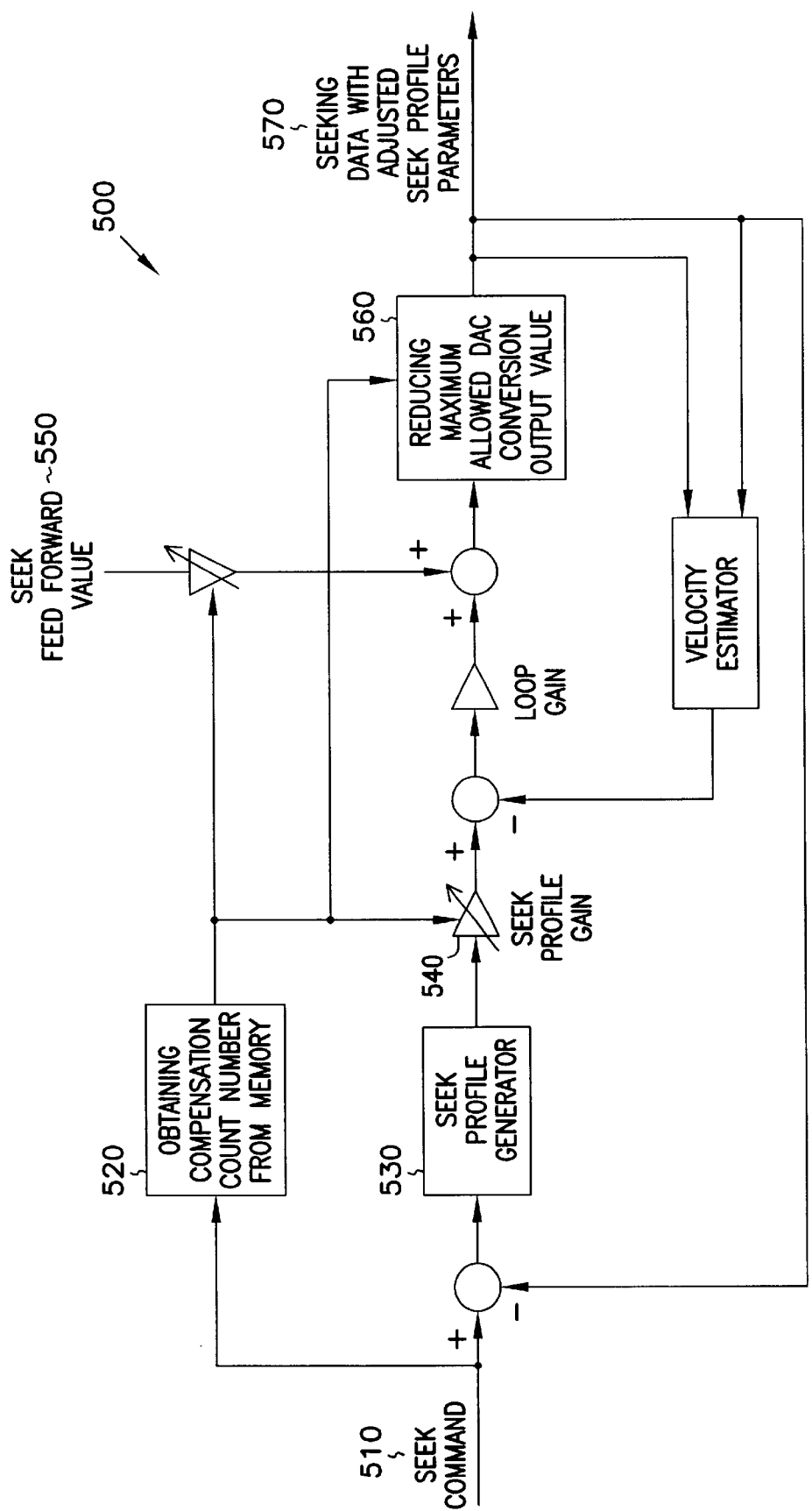
FIG. 5 is a block diagram of the present invention.

FIG. 5 is a block diagram illustrating one embodiment of a sequence of operation of adjusting seek profile parameters to eliminate resonance in an actuator arm during a seek operation of a disc drive 400. Upon receiving a seek command 510, the disc drive controller 200 obtains a compensation count number (N) from memory 520. Then the disc drive controller 200 generates a seek profile of the disc drive 530. Then the disc drive controller 200 adjusts a seek profile gain based on the value of N 540. Then the disc drive controller 200 adjusts a seek feed forward value based on the value of N 550. Then the disc drive controller 200 further adjusts a maximum allowed digital-to-analog conversion output value based on the value of N 560. After completing all of the adjustments to the seek profile parameters, the disc drive controller 200 issues a command to seek data based on the adjusted seek profile parameters 570.

Advantageously, the seek profile adjustment procedure set forth above and the apparatus for implementing the seek profile adjustment procedure allow for reduced production costs by salvaging disc drives having resonance, and allows to produce a more consistent throughput performance from disc drive to disc drive. Also the above procedure prevents the resonance from occurring in disc drives during seek operations. The seek profile adjustment procedure can be incorporated in microcode and used to control the servo circuitry to implement the invention. The end result will be a reduction in access times to data.

Figure 6:
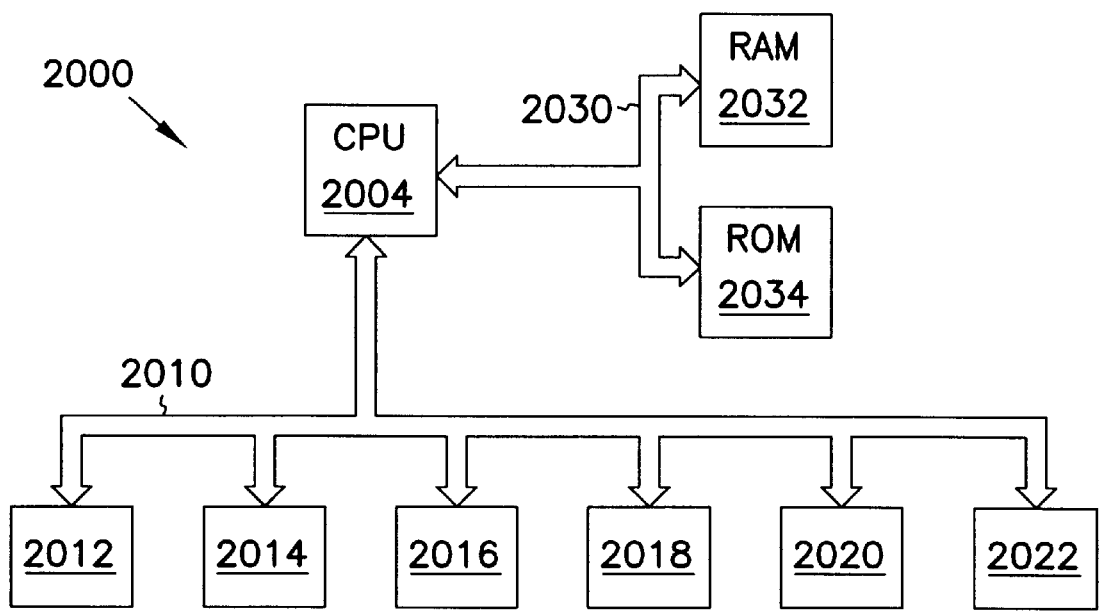
FIG. 6 is a schematic view of a computer system.

FIG. 6 is a schematic view of a computer system. Advantageously, the invention is well-suited for use in a computer system 2000. The computer system 2000 may also be called an electronic system or an information handling system and includes a central processing unit, a memory and a system bus. The information handling system includes a central processing unit 2004, a random access memory 2032, and a system bus 2030 for communicatively coupling the central processing unit 2004 and the random access memory 2032. The information handling system 2000 includes a disc drive device which includes the ramp described above. The information handling system 2000 may also include an input/output bus 2010 and several devices peripheral devices, such as 2012, 2014, 2016, 2018, 2020, and 2022 may be attached to the input output bus 2010. Peripheral devices may include hard disc drives, magneto optical drives, floppy disc drives, monitors, keyboards and other such peripherals. Any type of disc drive may use the method for loading or unloading the slider onto the disc surface as described above.

Conclusion

In conclusion, a disc drive controller 200 automatically adjusts the seek profile parameters for a zone of a disc drive 100 to eliminate resonance in an actuator arm 120. The method of adjusting seek profile parameters for a zone in a disc drive 300 includes the step of computing a maximum average settle time for the zone of an actuator arm 120 of the disc drive 100 based on a resonance screen test 310, then to compare the maximum average settle time for the zone to a predetermined threshold value 320. If the maximum average settle time for the zone is less than or equal to the predetermined threshold value, then accepting the disc drive without making anymore adjustments to the seek profile parameters. If the maximum average settle time is greater than the predetermined threshold value, then increasing a compensation count (N) by a predetermined compensation count number (N=N+predetermined compensation count number) 330, and adjusting the seek profile parameters to eliminate resonance in the actuator arm 120 based on the value of N (340, 350, and 360). Then the comparator compares N to a predetermined maximum number 370. If N is greater than the predetermined maximum number, then the disc drive is rejected for being not feasible to adjust the seek profile parameters anymore for resonance in the actuator arm. If N is less than the predetermined maximum number, then repeating the above outlined steps again.

Also discussed is a disc drive 100 including at least one disc 134 rotatably attached to the base through a shaft 16. The disc drive 100 also includes an actuator 120 having a transducer head 150, and a transducer 126 for reading and writing to the disc 134. The actuator 120 carrying the transducer 126 in a transducing relation with respect to the disc 134. A disc drive controller 200 is coupled to the actuator 120, includes a servo controller 220 to monitor settle times during a resonance screen test of the disc drive. The disc drive controller 200 further includes an analyzer 210 coupled to the servo controller 220, to obtain a maximum average settle time from the monitored settle times during the resonance screen test of the disc drive. The disc drive controller also includes a comparator 230, coupled to the analyzer 210 and the servo controller 220. The comparator 230 compares the maximum average settle time to a predetermined threshold value, and generates a first command signal, when the maximum average settle time exceeds the predetermined threshold value. Also included in the disc drive controller 200 is a counter 240 coupled to the comparator, to monitor a compensation count number (N), and to further increment the compensation count number by a predetermined compensation count number (N=N+ predetermined compensation count number), upon receiving the first command signal from the comparator, and to further generate a second command signal to initiate adjusting of the seek profile parameters of the disc drive 100. The disc drive controller further includes a memory 250, coupled to the counter and the comparator for storing the compensation count number and the predetermined threshold value.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method of determining seek profile parameters of an actuator arm to eliminate resonance during a seek operation in a disc drive, comprising the steps of:
   (a) computing a maximum average settle time for the actuator arm for a zone on the disc drive;
   (b) comparing the maximum average settle time for the zone to a predetermined threshold value;
   (c) if the maximum average settle time for the zone is less than or equal to the predetermined threshold value, accepting the disc drive without making anymore adjustments to the seek profile parameters;
   (d) if the maximum average settle time for the zone is greater than the predetermined threshold value, increasing a compensation count number (N) by a predetermined compensation count number (N=N+ predetermined compensation count number);
   (e) adjusting the seek profile parameters for the zone to eliminate resonance in the actuator arm based on N; and
   (f) if N is greater than a predetermined maximum number, rejecting the disc drive.

2. The method of claim 1, further includes step of:
   (g) if N is less than the predetermined maximum number, repeating the above steps.

3. The method of claim 1, wherein the computing step (a) further includes:
   (a)(i) computing a predetermined number of average settle times for the zone; and
   (a)(ii) obtaining the maximum average settle time for the zone from the computed average settle times for the zone;
   (a)(iii) repeating the above steps to obtain maximum average settle times for a predetermined number of zones on the disc.

4. The method of claim 2, wherein the computing average settle time (a)(I) for a zone includes computing an average settle time from a monitored settle times for a predetermined number of seeks for the zone on the disc.

5. The method of claim 4, wherein the predetermined number of zones on the disc is approximately in the range of about 10 to 40, and the predetermined number of seeks for a zone on the disc is approximately in the range of about 32 to 128.

6. The method of claim 1, wherein the predetermined threshold value is approximately in the range of about 1 to 10 microseconds.

7. The method of claim 1, wherein the predetermined compensation count number is one (1).

8. The method of claim 1, wherein the adjusting step (e) further includes:
   (e)(I) reducing a originally maximum allowed digital-to-analog conversion output value by a first predetermined value;
   (e)(ii) changing a seek feed forward value to a second predetermined value; and
   (e)(iii) reducing a originally set seek profile gain by a third predetermined value.

9. The method of claim 8, wherein the first predetermined value is $(½^N)$, wherein the second predetermined value is zero (0), and wherein the third predetermined value is 65%.

10. The method of claim 1, wherein the predetermined maximum number is in the range of about 2 to 6.

11. A method of adjusting seek profile parameters for a zone during a seek operation to eliminate resonance in an actuator arm of a disc drive, comprising steps of:
    (a) receiving a command to seek data from the zone on a disc of the disc drive;
    (b) looking for a stored value of compensation count number (N) for the zone;
    (c) generating a seek profile of the disc drive for the zone;
    (d) changing seek profile parameters based on the value of N to eliminate resonance in an actuator arm for the zone of the disc drive; and
    (e) issuing the command to seek data from the zone on the disc drive based on the changed seek profile parameters.

12. The method of claim 11, wherein the changing of the seek profile parameters based on N (d) further includes:
    (d)(I) reducing a originally maximum allowed digital-to-analog conversion output value by $(½^N)$;
    (d)(ii) if N is equal to zero (0), changing a seek feed forward value to one (1);
    (d)(iii) if N is greater than zero (0), changing the seek feed forward value to zero (0); and
    (d)(iv) if N is greater than zero (0), reducing a originally set seek profile gain by 65%.

13. A disc drive, comprising:
    a base;
    a disc rotatably attached to the base;
    an actuator arm for carrying a transducer head in a transducing relation with respect to the disc;
    a disc drive controller, coupled to the actuator arm further includes:
       a servo controller, coupled to the actuator arm, wherein the servo controller monitors settle times for a predetermined number of zones during a resonance screen test of the disc drive;
       an analyzer, coupled to the servo controller, wherein the analyzer obtains maximum average settle times for the predetermined number of zones from the monitored settled times during the resonance screen test;

a comparator, coupled to the analyzer and the servo controller, wherein the comparator compares the maximum average settle time of a zone to a predetermined threshold value, and generates a first command signal, when the maximum average settle time exceeds the predetermined threshold value; and a counter, coupled to the comparator, wherein the counter monitors a compensation count number(N), and further increments the compensation count number by a predetermined compensation count number (N=N+predetermined compensation count number), upon receiving the first command signal from the comparator, and further generates a second command signal to initiate adjusting seek profile parameters of the disc drive, wherein the servo controller adjusts the seek profile parameters of the disc drive upon receiving the second command signal from the counter based on the incremented N.

14. The disc drive of claim 13, wherein the servo controller, monitors the settle times to a zone for a predetermined number of seeks, wherein the analyzer computes the average settle time for the zone from the monitored settle times, and wherein the analyzer further computes a predetermined number of average settle times for the zone.

15. The disc drive of claim 14, wherein the analyzer computes a maximum average settle time for the zone from the predetermined number of average settle times.

16. The disc drive of claim 14, further includes a memory coupled to the counter and the comparator to store the N and the threshold value.

17. The disc drive of claim 13, wherein the adjustment to the seek profile parameters by the servo controller further includes performing steps of:

reducing a originally maximum allowed digital-to-analog conversion output value by $(\frac{1}{2}^N)$;

changing a seek feed forward value to 0 (zero); and reducing a originally set seek profile gain of the actuator arm by 65%.

18. A disc drive, comprising:

a base;

an actuator arm rotatably attached to the base;

at least one disc rotatably attached to the base, where the actuator arm carries a transducer head in a transducing relation with respect to the disc;

means for adjusting a seek profile of the disc drive to eliminate resonance in the actuator arm during a seek operation to a predetermined number of zones of the disc drive.

19. A method of determining seek profile parameters of a device comprising the steps of:

(a) comparing a maximum average settle time to a predetermined threshold value;

(b) if the maximum average settle time is greater than the predetermined threshold value, adjusting a compensation count number by a predetermined compensation count number; and (c) adjusting the seek profile parameters based on the adjusted compensation count number.

20. The method of claim 19 further comprising the step of rejecting the device if N is greater than a predetermined maximum number.

* * * * *